Oct. 24, 1950 J. M. BRADY 2,526,631

TELEMETRIC TRANSMITTER

Filed June 25, 1943 4 Sheets-Sheet 1

INVENTOR.
JAMES M. BRADY.

BY William D. Hall.
Attorney

TELEMETRIC TRANSMITTER

Filed June 25, 1943 4 Sheets-Sheet 2

*INVENTOR.*
JAMES M. BRADY.
BY William D. Hall,
Attorney

Oct. 24, 1950 J. M. BRADY 2,526,631

TELEMETRIC TRANSMITTER

Filed June 25, 1943 4 Sheets-Sheet 3

INVENTOR.
JAMES M. BRADY.

BY William D. Hall.
Attorney

Oct. 24, 1950 J. M. BRADY 2,526,631

TELEMETRIC TRANSMITTER

Filed June 25, 1943 4 Sheets-Sheet 4

INVENTOR.
JAMES M. BRADY.

BY William D. Hall
Attorney

Patented Oct. 24, 1950

2,526,631

UNITED STATES PATENT OFFICE 2,526,631

TELEMETRIC TRANSMITTER

James M. Brady, Washington, D. C.

Application June 25, 1943, Serial No. 492,334

7 Claims. (Cl. 177—380)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to telemetric systems, and more particularly to secret telemetric systems for automatically observing and transmitting the results of measurements made of physical quantities. Although it is not limited to any special type of physical measurement, the present system is particularly well adapted for the observation and transmission of meteorological data.

The methods of modern warfare make it extremely desirable that weather conditions prevalent both at home and in enemy territories be made known to personnel charged with the responsibility of planning military movements. Not only is it necessary that the conditions as they obtain at a particular moment be known, but the changes that these conditions undergo over relatively long periods of time are of equal importance.

Application of the present system may be had in peacetime as well as in times of war, especially when it is desired to maintain a satisfactory stream of meteorological information from inaccessible and uninhabitable regions, such as the wastelands of the polar regions, the forests and wilds of Africa and South America, or in desert lands.

A unit apparatus of this system may be attached to a parachute and allowed to fall from an airplane to such regions.

In accordance with the present invention, there is provided a generally improved telemetric system which renders possible the continuous observation of meteorological phenomena including temperature, pressure, relative humidity, sunshine, wind direction and speed, and such other phenomena as may be desirable, and the periodic transmission of the results of said observations in the form of code symbols corresponding thereto.

An object of the present invention is to provide an improved system for telemetering physical quantities from a point of observation to an intelligence center.

Another object of this invention is to provide, in such a system, a plurality of weather responsive elements each of which may be used to supply data corresponding to a different phase of the weather.

Another object of the invention is to provide a system which is characterized by the fact that the plurality of observations are made simultaneously.

Still another object of the invention is to provide a single means for transmission of a plurality of simultaneously occurring phenomena.

Another object of the invention is to provide means whereby the results of the observations made by each of said plurality of elements may readily be transformed into a series of code symbols characteristic of said results.

Still another object of the invention is to provide a system in which all of the operations are performed automatically.

Another object of the invention is to provide means for the secret transmission of the information.

For a better understanding of the invention together with other and further objects thereof, reference is had to the following description taken in connection with the accompanying drawings. The scope of the invention will be pointed out in the appended claims.

In the attached drawings.

Figures 3, 4, 5, 6, 7, 11:
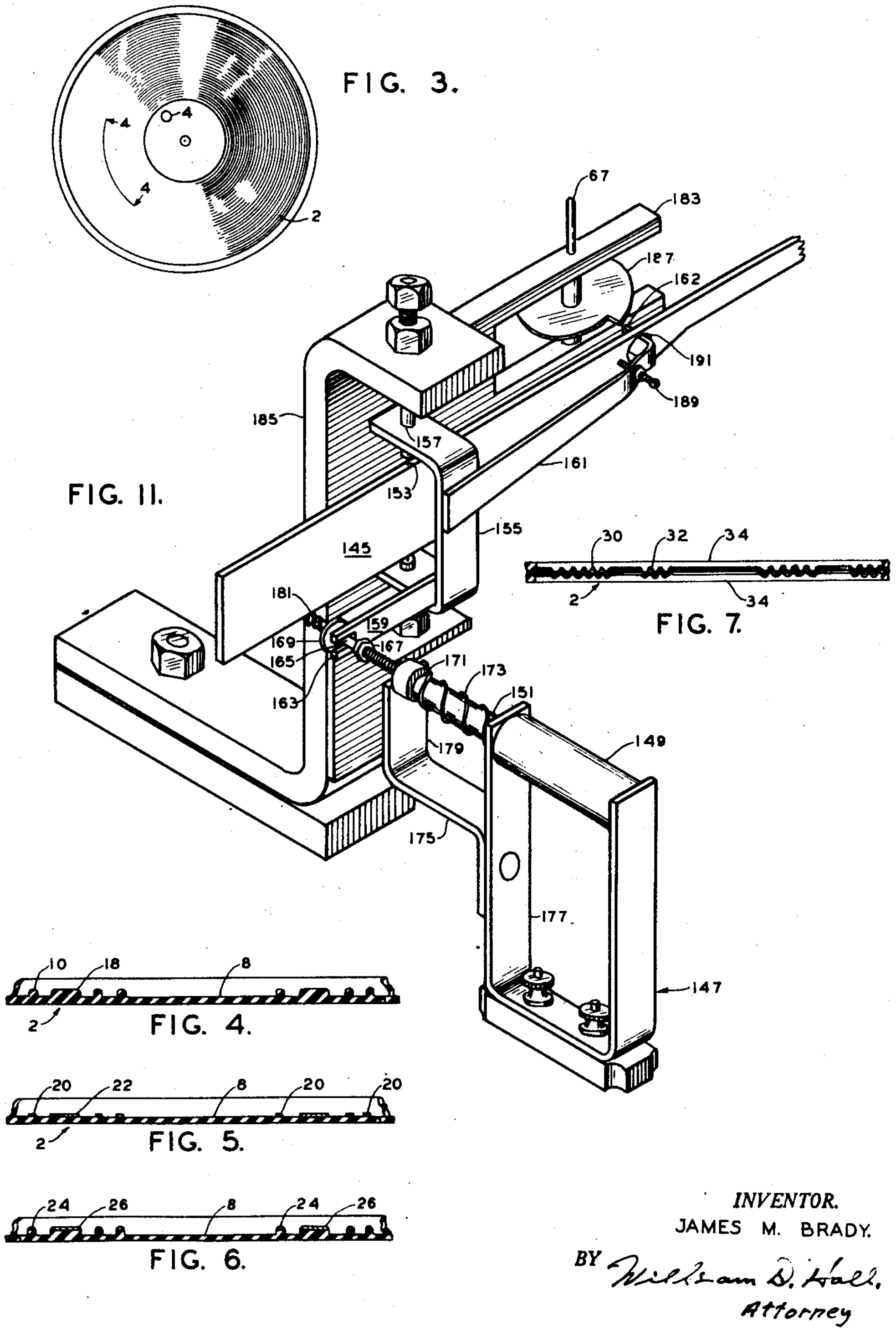
Fig. 3 illustrates a plan view of a recording.
Figure 10:
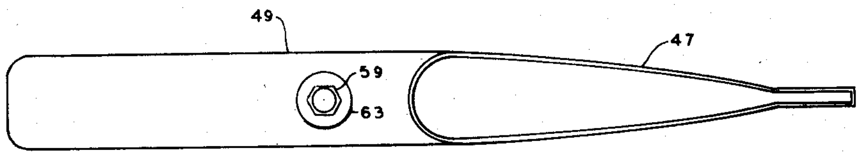
Figures 8, 9:
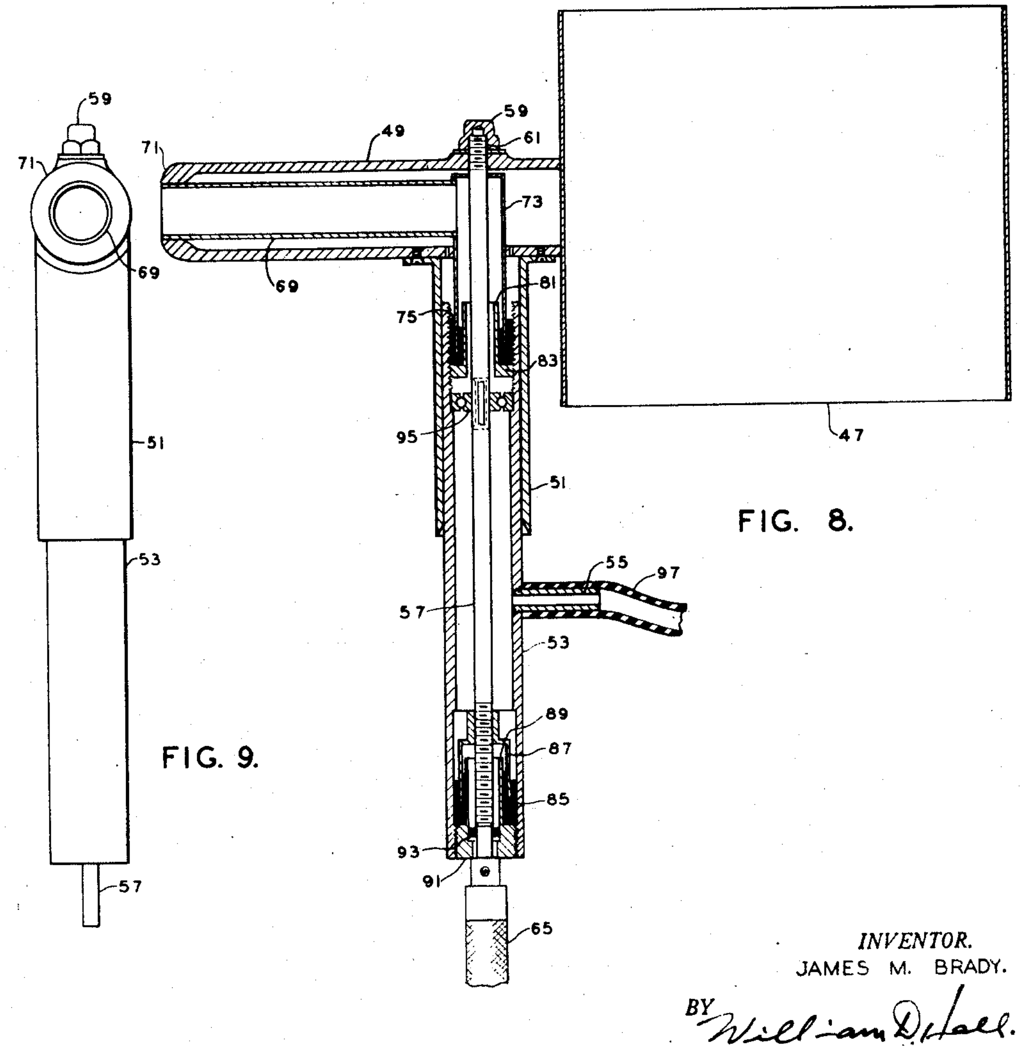
Figure 13:
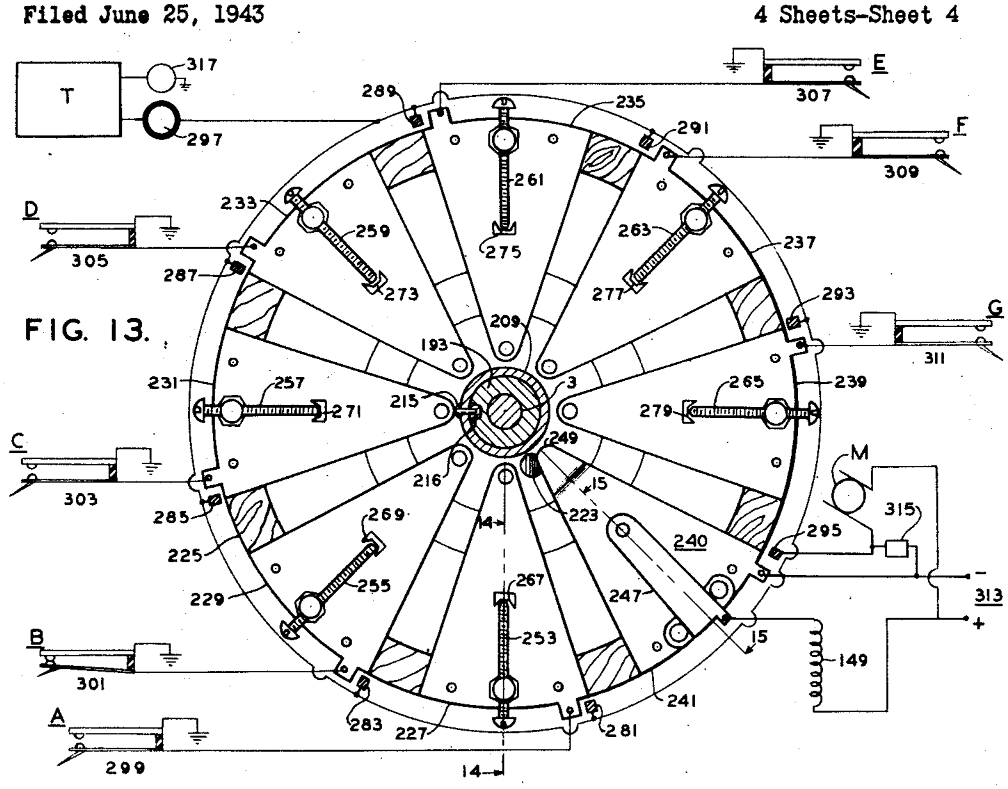
Figure 12:
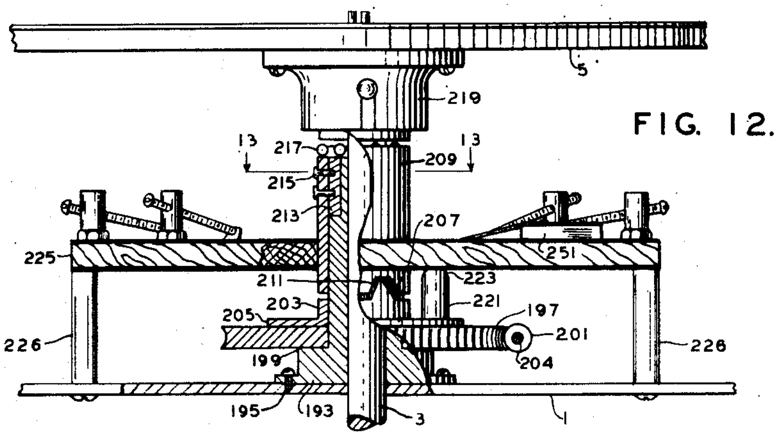
Figures 14, 15:
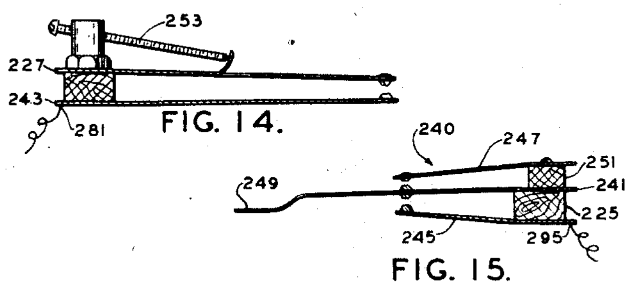

Figs. 4, 5, and 6 are cross-sectional views of three modifications of the recording taken along the line 4—4 of Fig. 3;

Fig. 7 is an enlarged fragmentary view of a recording groove as seen in plan;

Fig. 8 is a vertical section of a weather vane assembly;

Figs. 9 and 10 show the weather vane assembly of Fig. 8 in end elevation and plan respectively;

Fig. 11 is an enlarged isometric view illustrating the details of construction of a control mechanism;

Fig. 12 represents a partially sectioned side elevation of a turntable and distributor mechanism forming a part of the system;

Fig. 13 is a horizontal section taken along the line 13—13 of Fig. 12;

Fig. 14 is a vertical section taken along the line 14—14 of Fig. 13 and explanatory of one of the distributor switches; and Fig. 15 is a vertical section taken along the line 15—15 of Fig. 13 and shows a two-way switch for controlling the operation of the apparatus.

Figures 1, 2:
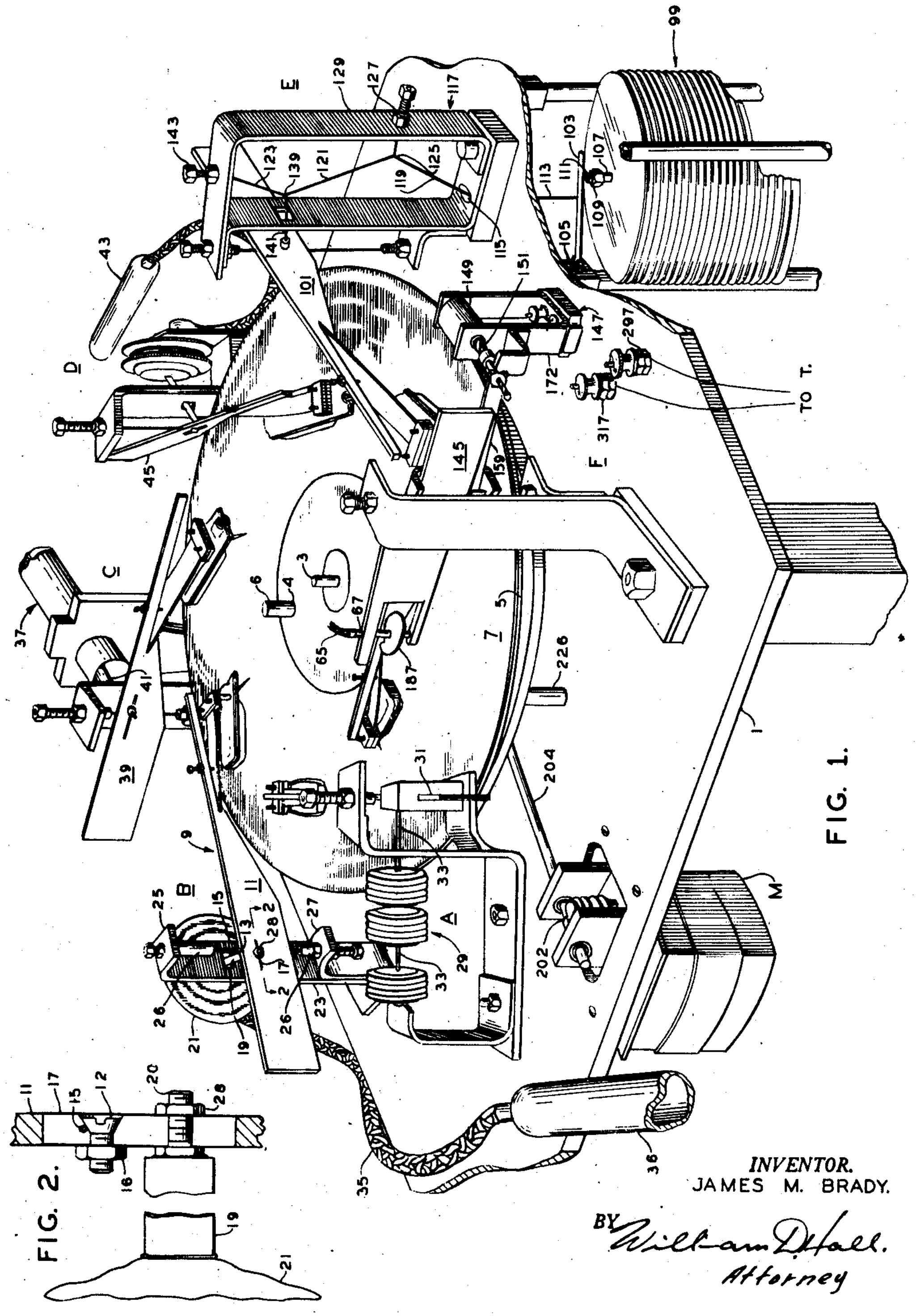
Fig. 1 is a perspective view of a unit of the proposed system.
Fig. 2 is an enlarged sectional view taken along the line 2—2 of Fig. 1.

Referring to the drawing and in particular Fig. 1 thereof, there is shown a form of the present invention which is suitable for semi-permanent ground installation.

As shown, it comprises a base or chassis 1, preferably made of metal, at the center of which there is disposed a vertical spindle 3 having a turntable 5 mounted thereon and keyed thereto for rotation and for limited reciprocal motion in a vertical direction. The turntable 5 carries a disc-shaped recording 7 for rotation therewith about said vertical spindle 3. A plurality of weather responsive units are positioned at suitable points about the turntable for coaction therewith. In the present system, I show six such units including unit A responsive to atmospheric pressure, unit B responsive to temperature, unit C sensitive to relative humidity, unit D which reacts to sunshine, and units E and F responsive to wind velocity and wind direction respectively. It is of course obvious that additional units responsive to other meteorological conditions may be added to those disclosed, or when it is desired that the system be simplified for aerial application, as, for example, by suspension from a free balloon in a manner well known in radio sonde, one or more of the units may be removed, the operation of the system being in no way limited to the number of units contained therein.

The weather responsive units A through F are operatively connected to the recording 7 by means of pickup arms, each carrying at its free end a needle which is adapted to ride in the grooves of said recording. The pickup arms are, in general, of identical construction. Hence a description of any one arm and its mode of suspension and movement will suffice for the description of all.

For the purpose of providing a balanced, mechanically stable pivot mounting for the pickup arm I prefer to use a filamentary suspension similar to that used in galvanometer suspensions although other pivot arrangements may be employed. I have found that, when suspended in this manner, the pickup arm is free to move under a minimum of resistive load, thus assuring more accurate positioning of the arm relative to the grooves of the recording 7, for a purpose which will hereinafter be described in detail.

As shown in Fig. 1, the pickup arm, generally designated by the numeral 9 and associated with the temperature responsive unit B, for example, comprises a substantially flat strip 11 of a light weight, rigid material which is considerably wider at one portion than at the other. At the wide portion of said strip and extending transversely therethrough, there is provided a cylindrical aperture 13 of sufficiently small diameter to snugly receive a filamentary element 15 which forms part of the suspension means for the said arm 9. Extending at right angles to and intersecting the cylindrical aperture 13 is a substantially rectangular slot 17 adapted to receive one end of a flat band of metal 19, which is connected at its other end to the adjacent face of an aneroid cell 21. The details of this construction are more clearly set forth in Fig. 2.

As shown in Fig. 2 the connection of the band 19 to the aneroid cell 21 may be made by spot welding, soldering or the like. The other end of the band 19 has a threaded portion 20, adapted to be passed through the rectangular slot 17 and held in position by means of nut 28 screwed on the threaded portion 20. The positioning of the band 19 relative to the filamentary element 15 is determined by the desired degree of sensitivity. That is to say, if it is dsired that a slight movement of the band 19, produced by an expansion or a contraction of the aneroid cell 21, cause a relatively large movement of the pickup arm about the axis of rotation 15, then the band 19 should be spaced a relatively small distance from the filamentary element 15. If, on the other hand, a lesser movement of the arm 11 is desired for the same movement of the band 19, the spacing between the latter and the filamentary element 15 is made correspondingly larger.

As shown in Fig. 1, the mounting for the filamentary element comprises bracket 23 which, at its lower end, is rigidly fixed in any convenient way, to the chassis 1 and is disposed perpendicularly thereto. The bracket is provided with a pair of spaced parallel projections 25, 27, each extending at right angles to the body portion of said bracket; the former being merely a normally bent portion of the bracket 23, while the latter may be a separate, substantially L-shaped member attached to the bracket at a point intermediate the upper projection 25 of the lower fixed end. Between the projections 25, 27, the tautly stretched wire, above identified as the filamentary element 15, is held in position by means of clamping jaws 26. The arm 9 may then be suspended on the wire 15 by slipping said wire through the cylindrical aperture 13 and fastening the ends thereof into position by means of the clamping jaws 26.

If it is desired to secure the arm 11 to the filamentary element 15 more positively than is possible by means of the snug fit above described, additional means are provided for this purpose.

As shown in Fig. 2, bolt 12 having a frustroconical head may be passed through the slot 17 and fastened into position by means of nut 18 in such a manner that the sloping side of the head cams or wedges against the filamentary element 15, thus holding it more tightly to the wall of aperture 13.

The arm 9, at its narrow portion, is provided with a pickup device of any conventional type for the purpose of translating modulations engraved in the grooves of the recording 7 into signals suitable for transmission to distant points. In the simplest form, this pickup device may be a "make and break" contact switch adapted to be actuated by the modulations in the groove. Such a pickup device is shown schematically in Fig. 13 and it will be described more completely in connection with this view.

The recording 7 which I propose to use is generally of a form similar to the common phonograph or transcription record. It differs however, from the common type of record in the fact that the grooves 2 (Fig. 3), are formed as a series of concentric circles rather than a continuous spiral of constantly varying radius. Thus it will be obvious that when a pickup needle engages a particular groove, unless it is willfully or inadvertently removed therefrom, it is restrained to ride in said particular groove during the rotation of the recording.

To guard against accidental slipping of the recording during its rotation, a circular opening 4 is provided radially spaced from the center of the recording and through which a peg 6 (see Fig. 1), carried by the turntable 5, may be passed.

When used in secret telemetric systems, the recording is provided with a set of nonsense code symbols engraved in each of the plurality of concentric grooves, each of said sets differing from the other in accordance with no defined system or correlation. In other words, it is my intention that it shall be impossible for any unauthorized person to detect any rational connection between the symbols engraved in one groove and those engraved in any other groove.

For simplicity, the following description is made using sets of symbols taken from the Morse International code as an example, with each set in a particular groove comprising several letters hopelessly jumbled. That is to say, in one groove the set may be LLX, while another may be AZB, and so forth.

The engraving of these symbols in the groove of the recording may be made either in the walls of the groove (lateral recording) or in the floor of the groove (hill and dale recording). The former type is shown in Fig. 7, while the latter is illustrated in Figs. 4, 5, and 6. In Fig. 4, I show a type of engraving in which the Morse code symbol for the letter L has been engraved by raising the floor 8 of the groove 2 into relatively short upwardly extending projections or hills 10 and relatively long upwardly extending projections or hills 18, the hills 10, 18 corresponding to dots and dashes respectively.

In Fig. 5, I show another type of engraving in which there is plated on the floor 8 of the groove 2 a series of narrow metallic plates 20 and wide metallic plates 22 corresponding to the dots and the dashes, respectively, of the Morse code.

In Fig. 6, still another modification is shown wherein the dots and dashes are provided by means of elevating the floor 8 into a series of relatively short hills 24 and relatively long hills 26, as in Fig. 4, with the upper faces of said hills plated with metallic foil.

In each of the two forms shown in Figs. 4 and 6, the pickup needle, while riding the groove, will be caused by the hills and dales to rise and fall intermittently. It is proposed to use this intermittent rising and falling of the needle to close and open an electric circuit, producing a keying action in accordance with the particular set of symbols engraved in the groove, which can readily be applied to a radio transmitter T (Fig. 13) of any conventional design. In connection with the form shown in Fig. 5 a pickup device employing a pair of needles insulated from each other may be used to ride in the groove of the record so engraved. Electrical connection between the needles is provided when the needles engage the plated portions 20, 22 of the groove.

In Fig. 7, there is shown still another way of engraving the symbols in the recording. Here, audio frequency modulation, shown schematically as a long sequence of waves 30 and a short sequence of waves 32 are cut into the walls 34 of the groove 2. This type of engraving may be used with a vibratile pickup device having an electrical contact which is disturbed when the pickup device follows the vibrations engraved in the groove placing enough resistance in the circuit to effectively key the transmitter T.

It may be noted that between the hill and dale method of engraving the modulation and the audio frequency method there exists the advantages and disadvantages of simplicity on the one hand and more positive keying action on the other. That is to say, the hill and dale method is a simpler expedient, whereas the audio frequency engraving is more positive in its keying action.

The weather responsive units differ among themselves with respect to the specific apparatus employed for the purpose of causing substantially radial movement of the pickup arms across the recording 7. For example, the pressure responsive unit A comprises a train of evacuated capsules or aneroid cells 29, serially connected to each other and to arm 31 by means of lengths of relatively stiff wire 33. Under the influence of the atmospheric pressure, the cells 29 expand or contract with decreasing or increasing pressure. The additive effect of the responses of each acts in such a way as to cause a cumulative lateral movement of wires 33, the terminal one of which is connected to the arm 31 in the manner described in connection with the arm 11 of unit B. The resultant motion of arm 31, in response to the movement of the terminal wire 33, is like that described in connection with arm 11.

In unit B, the temperature responsive element may be a metallic, cylindrical shell 36, filled with mercury or any other suitable fluid which under the action of temperature changes expands and contracts. The change in volume of the fluid is transmitted by means of a flexible connection 35 to a pressure actuated capsule 21. The movements of the walls of the capsule 21 are translated to corresponding movements of the arm 11, as hereinbefore described in detail.

Unit C responds to changes in relative humidity in accordance with the action of a conventional hair hygrometer 37 whose hair element (not shown) is connected to the arm 39 by means of a stiff cylindrical rod 41 connected thereto. Contractions and elongations of the hair are thus effective to cause movement of the arm 39 across the transcription record.

Unit D includes a conventional sunshine responsive element 43, the responses of which are employed to effect the positioning of the arm 45 relative to the recording 7 in the manner described in connection with the foregoing units.

Because units E and F, the wind velocity and wind direction units, respectively, are operatively connected to wind vane assembly shown in Figs. 8, 9, and 10 in a manner quite unlike that described above, a fuller description thereof is herewith included. As shown in the figures, and especially Fig. 8 the wind vane assembly comprises a tail or vane 47 and a tubular member 49 rigidly attached to one edge thereof. The assembly is a dual purpose apparatus including means for indicating wind direction and means for measuring wind pressure. If desired, independent structures may be used, one for indicating the direction of the wind, the other for measuring the pressure thereof. The present form of equipment combines the two functions and has the advantage that the wind pressure is taken in proper direction at all times whereas with independent structures it has been found that measurements of the wind pressure are often made with the wind instrument oriented at an angle to the prevailing wind direction, thus producing spurious results.

In the dual purpose apparatus herein described, a hollow casing 51 is fixedly connected to said tubular member 49 and is perpendicularly disposed thereto, preferably at the common center of gravity of the tail 47 and tubular member 49. The casing 51 is rotatable on a hollow casing 53 and so permits the vane 47 to align itself in the direction of the wind. Casing 53 is non-rotatable and is provided with a delivery tube 55 opening in the side wall of the casing.

Extending axially through the tubular members 51, 53 and transversely through the hollow tubular member 49 is a rodlike spindle 57 rigidly connected to said hollow tubular member 49 by means of nut 59 which is received by the externally threaded end 61 of the spindle 57. The lower end of the spindle 57 is connected by means of a conventional flexible cable 65 to the upper end of the spindle 67 (Fig. 1) of the unit F in such a way that the orientation of the wind vane assembly caused by the effect of the wind on the tail 47 is transmitted to the spindle 67 to cause a similar orientation of a cam wheel, for a purpose which will hereinafter be described.

The tubular member 49 carries pressure tube 69 which is supported in coaxial relation therewith by means of an internally flanged portion 71. The inner end of the pressure tube 69, communicates with a tube 73 with an airtight fit so as to have the effect of an integrally formed elbow tube.

In order to provide for easy rotation of the wind vane assembly relative to the stationary upright casing 53, and in order to make certain of the fact that a stream of air conducted by the elbowed pressure tubes 69, 73 is directed, without loss, to the delivery tube 55, I have provided an annulus of mercury 75 into which the free end of the tube 73 may be inserted. A well for the mercury annulus 75 is formed by means of a tubular member 81 having a flange 83 threadedly received in the stationary casing 53, thereby forming a circular trough or well into which a quantity of mercury is poured.

Mercury has been selected instead of any other liquid for this purpose, because it was found that a liquid heavy enough to withstand the pressure of the air is required in order to avoid a spill over the liquid into the space between the telescoping tubes 51, 53 due to the increased pressure on that portion of the liquid surface inclosed within the walls of the tubes 73 and 81.

At the lower end of the spindle 57 and at a point adjacent to the bottom of the tube 53, similar means are provided to permit easy rotation of the spindle 57 in the stationary tube 53 and at the same time preventing the escape of the entrapped air through the coupling mechanism. As shown in Fig. 8, a mercury well 85 is housed in a circular trough to receive a downwardly extending cup 87 which is attached to the spindle 57 for rotation therewith.

The mercury well 85, as shown, is formed between the inner surface of the tube 53 and outer surface of a tubular member 89 having a threaded flange 91 acting as the bottom of the well. Interposed between the spindle 57 and the hollow interior of the tubular member 89, there is a ball bearing 93, for the purpose of reducing any frictional effects. Additional ball bearings may be supplied as at 95 between the stationary casing 53 and the spindle 57 for the same purpose. It will be clear from the above description that a steady stream of air may thus be maintained starting from the open end of and through the pressure tube 69, downwardly through the vertical tube 73, through the space between the inner surface of the upwardly extending tube 81 and the spindle 57, thence through the spaces in ball bearing 95, to the delivery tube 55, whence it may be conducted by means of a flexible hose 97 attached to the free end of the tube 55, to a conventional type of expansion bellows 99 (Fig. 1) for the purpose of effecting the movement of the arm 101 of the wind velocity unit E.

As shown in Fig. 1, the means provided for the transmission of the vertical movement of the expansion bellows 99 caused by the pressure of the air stream conducted thereto in the manner described above to cause substantially radial movement of the arm 101 comprise a lever 103 pivotally mounted at one end to a stationary support member 105. At a point adjacent to its free end, the lever 103 is fixedly attached to the upper surface of the expansion bellows 99 by means of an upwardly extending lug 107 which is spot welded to the upper surface of the bellows 99. The lug 107 is provided with a pair of clamping jaws 109 adapted to receive a downwardly extending projection 111 attached to the lever 103. At a point on the lever 103 intermediate the pivot at 105 and the connecting element 109 a relatively stiff wire 113 is attached and extends upwardly through an opening 115 in the chassis 1 and the bracket support 117.

The wire 113 is then formed into a motion multiplying zigzag arrangement comprising elements 119, 121 and 123. The junction 125 between the elements 119 and 121 of the arrangement is maintained by a mooring effected by means of a horizontally disposed machine screw and nut arrangement 127 affixed to a vertical portion 129 of the bracket support 117. The junction 139 of the zigzag arrangement is connected to the horizontally disposed wire 141 which is connected to the pickup arm 101 in a manner described in connection with the pickup arm of unit B. The zigzag arrangement is supported from above by means of a clamping screw 143 carried by a horizontal portion of the bracket 117. Thus it will be clear that with changes in the velocity of the wind entering the pressure tubes 69, 73 (Fig. 8) of the wind vane assembly, changes in pressure corresponding thereto will be experienced by the bellows 99. The pressure changes cause expansion and contraction of said bellows 99 which through the intermediary of the zigzag arrangement manifests itself in the selective positioning of the arm 101 relative to the recording 7.

The mounting of the arm associated with the wind direction unit F is more complicated than that of the other arms in order to provide a lost motion connection to permit sudden changes in wind direction which may occur in gusts while the needle is in engagement with the recording without causing corresponding movement of the arm, thereby spoiling or scratching the recording by dragging the needle across it. Said lost motion connection includes generally a cam wheel 187 rotatably carried by the spindle 67 (Fig. 1) and actuated by the spindle 57 (Fig. 8) of the wind vane assembly. As shown in the enlarged view of the unit shown in Fig. 11, the means provided for bringing arm 145 of the unit F into operative engagement and disengagement with the cam wheel 187 include a substantially laterally reversed C-shaped bracket carrying a pair of horizontally extended arms 159 and 161.

The substantially radial movement of the arm 145 of the wind direction unit F is effected by means of an electro-magnetic attachment 147 which comprises a solenoid 149 and an armature 151 telescopically received thereby. Arm 145 is mounted on a filar suspension 153 in the manner described above in connection with the suspension of the arm 11 of unit B.

Certain modifications, however, are to be found in unit F which make it peculiarly well adapted for use with the wind direction unit. The bracket 155 is pivotally mounted on vertically disposed cylindrical members 157 which, in turn, are coaxially supported with the filar suspension 153. The bight portion of the bracket 155 carries the horizontally extending arms 159 and 161, the former being fixedly attached to said bight portion at its lower junction; the latter being attached to the bight portion at a point near its upper junction. The arm 159 is bifurcated at its free end as shown at 163 in order to receive a rod 165 projecting from the armature 151. The rod 165 carries a nut 167 adjustably positioned thereon and a loosely fitted washer 169 spaced from said nut, with the arm 159 disposed intermediate between said nut 167 and said washer 169 in such a manner that the motion of the arm 159 relative to the rod may be limited by said nut and washer. The armature 151 is provided with a collar 171 adjustably affixed thereto and a coil spring 173 of suitable stiffness against the compressional force of which the armature moves when the solenoid 149 is energized. The collar 171 cooperates with a stationary stop 179, at the upper end of an angle iron 175 attached to one of the upright supports 177 of the electromagnetic attachment 147. The upwardly extending portion 179 of said angle iron serves to limit the outward movement of the armature 151 when the armature is free to move under the action of the coil spring 173. When the energizing current in the solenoid 149 is removed, the translatory movement of the armature 151 and rod 165 causes a rotational movement of the bracket 155 through the intermediary of the arm 159, the nut 167 and the washer 169 in the following manner: when the electromagnetic attachment is energized by an electric current the armature 151 is drawn into the solenoid 149 against the action of the spring 173. If it is desired to further cushion this movement of the armature, an additional coil spring 181 may be mounted at the remote end of the rod 165. During its inward movement, the armature carries with it the washer 169 which, in turn, engages the bifurcated end 163 of the cross-arm 159, thereby imparting to it a counter-clockwise rotation about the axis of rotation 157, as viewed from above. When the solenoid 149 is de-energized, it will be clear from the foregoing description of the stop means, that the expulsion of the armature 151 by the coil spring 173 will be limited by the abutment of the collar 171 against the upwardly extending portion 179 of the angle iron 175. Simultaneously, however, the nut 167 mounted on the reduced portion 165 of the armature engages the bifurcated end of the arm 159 and causes it to rotate in a clockwise direction about the axis of rotation 157.

As described above, the rotational movement of the wind vane assembly is transmitted from the spindle 57 (Fig. 8) by means of a conventional type of cable 65 to the spindle 67 (Fig. 11) rotatably mounted between the arms 183 forming part of the bifurcated projection of the bracket support 185 of unit F. Attached to the spindle 67 and positioned intermediate the arms 183 for rotational movement, there is provided a cam wheel 187, the variation in radius of which is in accordance with a predetermined range of values. The arm 161 which was hereinbefore described as fixedly attached to a point on the bight portion of the bracket near the upper junction thereof, is provided at its free end with a portion bent at right angles to the long axis thereof to produce an abutment surface 162.

An adjustable set screw 189 is provided on the long axis of the arm 161 at a point near the bent end portion of said arm for the purpose of supplying an operative engagement between said arm 161 and the pickup arm 145. When the arm 161 is caused to rotate in a counter-clockwise direction as viewed from above, the bent portion of the arm readily passes through an opening 191 in the pickup arm 145 and the end of the set screw 189 engages and moves the pickup arm 145 until brought to rest by engaging the edge of the cam wheel 187.

Hence, depending upon the instantaneous direction of wind, an edge surface of the cam wheel 187 corresponding to a particular radius is presented to the bent portion of the arm 161. If the particular radius thus presented is of small magnitude, it follows that the arm 161 and the pickup arm 145 will have a relatively large radial movement before it is brought to rest, while on the other hand, if an edge surface of the wheel 187 corresponding to a longer radius is presented, the movement of the arms 161 and 145 will be correspondingly smaller. In this manner, the positioning of the pickup arm 145 in accordance with wind direction is readily effected.

I have thus described the details of the several weather responsive elements together with the associated pickup means and mechanism whereby said pickup means may be selectively positioned relative to the recording 7.

It should be understood that during the time when the pickup means are being positioned with respect to the disc, said means are not in actual engagement with the recording 7, but are suspended above or spaced therefrom. In order to bring the pickup arms into operative engagement with said recording at such times as it is desired to transmit messages corresponding to the instantaneous values of the several meteorological elements, I provide means for raising the turntable 5 on which the recording 7 is carried.

Referring to Fig. 12, there is shown the rotatable spindle 3 which carries at its upper end the turntable 5. Means for rotating the spindle are not shown in detail, and may be conventional. The spindle is rotatable in a housing 193 which is fixedly attached to the chassis 1 by suitable machine screws 195. A worm wheel 197 is seated on a horizontal step 199 formed in the housing 193. The worm wheel 197 is adapted to be driven for coaxial rotation with the spindle 3 by the worm gear 201 whose motive power may be the same as that used for driving the spindle 3 or it may be an independent source. A conventional reduction gear mechanism 202 (Fig. 1) is driven by motor M and connected to shaft 204 for the purpose of maintaining the speeds of the turntable and the worm wheel in a ratio of approximately 30:1. The connection from motor M to spindle 3 is not shown.

Carried by the worm wheel 197 and connected thereto for coaxial rotation therewith is a cylindrical cam 203 having a flange portion 205. The cam 203 is provided with a cam rise or projection 207. Cam 203 acts on a cam follower 209, which in the present case is cylindrical and mounted exteriorly of the stationary housing 193. The cam follower 209 is provided on its lower edge with a recess 211. The follower is restrained from rotational movement about the housing 193 by a key 213 which is pinned to the follower by pins 215. They key 213 is slidable in a vertical slot 216 (Fig. 13) provided in the housing 193.

During the rotation of the cam 203 the cam rise 207 rides along the slant surface of the recess 211 causing the cam follower to be elevated to a point such that the apex of the projection 207 engages the lower edge of said cam follower 209. Upon the completion of one revolution of said cam, the projection again reaches the recess 211 in the cam follower, whereupon the projection reenters the recess and permits the follower to fall due to its weight until the apex of the projection engages the face of the recess 211.

At its upper edge the follower 209 carries a race of thrust bearings 217 by means of which a base plate 219 attached to the under surface of the turntable 5 may be raised vertically during the time that said turntable is being rotated by the spindle 3.

A cylindrical stub 221 having at its upper end a cam surface 223 for a purpose which will presently be described, projects upwardly from the flange portion 205 of the cam 203.

I have disclosed in Fig. 13 what may be termed the "distributor system" for the plurality of pickups hereinbefore described in detail. Forming part of this figure and diagrammatically represented therein are the pickups and an associated network here included in order to show their relation to the distributor system. The present invention contemplates the use of a single transmitter to be used by all the weather responsive units. It is of course necessary to provide switch means whereby a selected one of the units may be connected to the transmitter at a time. When its message has been transmitted, this unit is disconnected and another unit connected to the transmitter. The distributor system thus provides for the transmission of the information picked up by each of the units in sequential order.

The system in its broadest aspects comprises a ring 225 of wood or other insulating material fixedly supported on the chassis 1 by posts 226 (Fig. 12) and to which are fastened at regularly spaced intervals a plurality of substantially wedge-shaped conducting sectors 227 through 241. As shown, there is one of said sectors for each of the aforementioned pickup arms. The sectors 227 through 241 form the upper plates, respectively, of a plurality of make and break contact switches connected to the pickup devices of the units A, B, C . . . G. As shown in Fig. 13, one switch has been provided in excess of the number of units described and shown in Fig. 1. It will be understood that an additional weather responsive unit may readily be added to those shown and described, which additional unit would then be electrically connected to the extra switch. The lower plates of said switches are of a form identical with that of the upper plates 227 through 241 and are not shown in Fig. 13. However, Fig. 14 represents a section of one of said contact switches in which the lower plate is designated by the numeral 243.

The previously mentioned stub 221 is adapted to rotate with the flange portion 205 of the cam 203 under the lower plates of the contact switches in such a manner as to selectively and serially engage said lower plates to cause them to flex upwardly closing the contact between the said lower plate and the upper plate of the respective switch.

Adjustment of the points on each of the contact switches associated with the various weather responsive units is made by means of set screws 253 through 265 carried on the upper plates 227 through 239 of said contact switches at points near the periphery thereof. A plurality of lugs 267 through 279 are struck upwardly from the upper plates 227 through 239 in such a manner that when the set screws are turned inwardly and bear against the lugs, the upper plates are caused to flex in a direction such that the points are brought closer together. The contacts are normally open and are adapted to be selectively and serially closed by the stub 221 (Fig. 12) as it rotates under the lower plates of said contact switches.

From an inspection of Fig. 13, it will be apparent that there is one sector shown at 241 which is not related to any of the weather responsive units described above. The latter sector 241 forms part of a two-way switch 240 and is, therefore, of different form than the other contact switches hereinbefore described.

As shown in Fig. 15, the two-way switch 240 comprises three blades 241, 245, and 247, the uppermost and lowermost ones of which, namely 245 and 247, are of identical form, while the intermediate blade 241 is of a form substantially like the plates 227 through 239. One distinguishing feature is the fact that at a point adjacent to the apex of the blade 241 there is an offset portion 249. Said plate 241 is normally downwardly flexed in such a manner that the point on the lower face of plate 241 and the point on plate 245 are in contact. As shown, the lowest plate 245 is spaced from the intermediate plate 241 by a section of the annulus 225, while the intermediate plate 241 is spaced from the uppermost plate 247 by an additional block 251 of wood or other insulating material.

In Fig. 13, the shaded squares 281 through 295 represent electrical connections to the lower plates of the above described switches. Plate 243 (Fig. 14) and plate 245 (Fig. 15), it will be recalled, are exemplary of said lower plates. The connections 281 through 293 are wired to each other and then in common to a binding post 297 carried by and insulated from the chassis 1. The upper plates 227 through 239 of the contact switches are connected through the pickup elements 299 through 311 here shown and described as mechanical make and break or vibratile contacts. It will be understood that any conventional type of pickup element, such as, for example, the common crystal type, may be used for the same purpose. It has been found, however, that the crystal type of pickup when used with the lateral recording of Fig. 7 yields spurious results when exposed to extremes of weather conditions. Hence, the use of the crystal type is limited to a relatively small range of meteorological variations. On the other hand, the mechanical vibratory type of pickup has been found to withstand extremes of weather conditions without appreciable harmful effects.

As shown, the lowermost plate 245 of the two-way switch 240 is connected, as at 295, through motor M to the positive terminal of a battery or any other D. C. source of electric potential 313. The intermediate plate 241 is connected to the negative terminal of the same battery, while the uppermost plate 247 is connected through the solenoid 149 to the positive terminal of the battery. A conventional programming clock 315 is connected in shunt across the electrical connection 295 of the lowermost plate 245 of the two-way switch 240 and the intermediate plate 241 of the same switch. Said programming clock 315 is provided, in accordance with conventional design, with means for closing an electrical circuit at predetermined times and for keeping the circuit closed for predetermined lengths of time. As employed in the present invention, the programming clock 315 is included in the network in such a way that at a certain instant an electrical time delay switch (not shown) is closed connecting motor M directly across the terminals of battery 313. An adjustment of the time delay switch may be made in the clock mechanism to keep the switch closed for the desired time interval during which solenoid 149 of the wind direction unit is to be energized to locate the wind direction pickup as the turntable rises.

Binding post 317 is mounted on the chassis 1 and is electrically connected thereto for the purpose of providing a connection to ground. Connections from the binding posts 297 and 317 may be made to a radio transmitter T. Any suitable conventional network may be employed for the purpose of permitting the modulation obtained in the form of either Morse code dots and dashes or audio-frequency signals of predetermined frequency to key the transmitter. Since the transmitter forms no part of the present invention, a fuller description thereof is not deemed necessary.

It will be understood that in the event that wire communication to the intelligence center is feasible and preferred, the output of the pickups may be fed directly to the wires of such a wire telemetric system, instead of being used to modulate a radio transmitter as above described.

In operation, the assembled apparatus with its power supply, usually in the form of a battery, is housed in any suitable container and left in the location selected as the observation site. The weather responsive elements of the apparatus are of course exposed to the atmosphere in such a manner that they may freely react to the weather.

As changes in atmospheric conditions occur, the pickup arms connected to the weather responsive elements are caused by said elements to assume positions relative to the recording as determined by the particular values of the individual phases of the weather. As pointed out in the foregoing description of the apparatus, the radial motion of the pickup arms and the positioning thereof relative to the recording is made possible by reason of the fact that during periods of inactivity the recording is in a position below and out of engagement with the pickup arms.

It should be pointed out at this time that a preliminary adjustment or setting of stub 221 should be made in order to position said stub directly under the two-way switch 240 engaging the plate 241 just enough to raise it away from and out of contact with plate 245. In other words the two-way switch 240 should preliminarily be open with respect to both contacts (Fig. 15).

At the instant when it is desired to start transmitting the acquired information and at predetermined intervals thereafter, the programming clock mechanism 315 causes its time delay switch to close, thus energizing the motor circuit. Thereupon, the spindle 3 is set into rotation by the motor and with it the turntable and the recording carried thereby. Simultaneously the worm gear 201, the wheel 197 and the cam 203 are put into rotation at a speed substantially 1/30 of the rotational speed of the recording.

The stub 221 carried on the flange 205 of the cam 203 then proceeds to revolve about the common axis of rotation in such a manner that the slant surface 223 thereof cams along the intermediate plate 241 of the two-way switch 240 closing the contact point between the intermediate plate 241 and the upper plate 247. Thus a current from the battery is directed through the solenoid 149, the energizing of which causes the positioning of the arm 145 relative to the recording 7 as hereinbefore described in detail.

At the same time the cam follower 209 is raised by the cam rise 207 to such a position that the recording already set into rotation, is elevated bringing it into engagement witth the positioned pickup arms, the needles of which enter into and ride within selected grooves of said recording.

By this time the stub 221 has become disengaged from the two-way switch 240 permitting the intermediate plate 241 to resume its normal position with the lower contact of plate 241 in engagement with the contact point of plate 245. The current energizing the solenoid 149 is thus removed, whereupon, the armature 151 is forcibly ejected from said solenoid 149 causing the bent portion 162 of the arm 161 to become disengaged from the cam wheel 187. Thus the cam wheel 187 may be freely rotated by the wind direction assembly without affecting further positioning of the arm 145 and its associated needle relative to the recording. The rotation of the motor and the rotatable elements driven thereby are maintained through the lower half of the two-way switch 240, although the circuit through the programming clock mechanism is subsequently broken. When the stub 221 has passed by the two-way switch 240, it engages the lower plate of the contact switch connected to unit A, closing the circuit through the switch and directing the electric current through the pickup needle connected to the pressure responsive unit. This circuit permits the modulations engraved in the groove of the recording in which the needle rides to be applied to the transmitter T. Hence, during the time that the stub 221 maintains the switch in closed position, the transmitter T is modulated in accordance with a particular set of code symbols interpretable as the particular value of the atmospheric pressure measured at the instant when the recording 7 was brought into engagement with the pickup arms.

When the stub 221 slides off the lower plate of the contact switch connected to unit A and onto the lower plate of the contact switch connected to unit B, the former switch is opened and the latter is closed permitting the modulations engraved in the groove on which the pickup needle of the temperature responsive element is riding to be transmitted. Similarly, the modulations engraved in the grooves occupied by the pickup arms of the other weather responsive units are serially applied to the transmitter.

When a cycle has been completed, the stub 221 once again assumes a position under the intermediate plate 241 of the two-way switch 240 raising said intermediate plate out of contact with the lowermost plate 245. The motor circuit is thereby broken causing the motor to come to rest and completing the present series of transmissions. Sometime later, another series of operations similar to those described above may be made in the same manner.

At the intelligence center the transmitted signals may be received by a receiver (not shown) and de-coded to yield the information concerning the various meteorological elements.

I have thus described an apparatus and the method of operation thereof which makes possible the observations of a plurality of meteorological or other physical quantities and the transmission thereof from the point of observation to a distant point.

While I have shown a system comprising six weather responsive units, it is to be understood that my invention is not to be limited to this number, it being quite obvious how additional units may be added or how one or more of the units may be removed at will. It is also apparent that the order of arrangement of the various weather responsive units may be altered when it is learned that the secrecy of the messages has been impaired. Furthermore, a plurality of recordings may be provided each differing from the other in the nature and the orientation of the nonsense code symbols engraved in the grooves.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. The combination including a variable weather responsive element having a range of values corresponding to the range of weather conditions to be observed, a turntable, a disc shaped transcription record carried by said turntable for rotation therewith, said record having a plurality of concentric circular grooves of varying radii engraved on one face thereof, a series of code symbols corresponding to said range of values embedded in each of said grooves, a pickup movable by said element and pivotally mounted adjacent and for substantially radial movement relative to said record, means rotating said turntable and said record, additional means moving said rotating record into engagement with said pickup whereby said pickup is actuated by the one of said code symbols corresponding to the observed state.

2. The combination including a variable weather responsive element having a range of values corresponding to the range of weather conditions to be observed, a vertical shaft, an axially reciprocable turntable carried by said shaft, disc shaped transcription record carried by said turntable for rotation therewith, said record having a plurality of concentric circular grooves of varying radii engraved on one face thereof, a series of code symbols corresponding to said range of values embedded in each of said grooves, a pickup having an electrical contact, operatively connected to said element and pivotally disposed above, for substantially radial movement in a horizontal plane across the engraved portion of said record, means for rotating and elevating said turntable and said record whereby said pickup may engage the one of said code symbols corresponding to the observed state and thereby actuate said electrical contact in order to key said transmitter.

3. The combination including an element responsive to wind direction, said element having a range of orientations corresponding to the range of wind directions to be observed, a code transcription device having a plurality of code symbols corresponding to each of said orientations, a pickup mounted for movement across said transcription device and engageable therewith for selection of a certain one of said code symbols corresponding to one of said orientations, cam means movable by said element for limiting the movement of said pickup relative to said transcription device, means causing said pickup and said cam means to mutually engage and disengage in alternation.

4. In combination with a transmitter, a plurality of elements each responsive to a different component of the meteorological conditions to which they are exposed and each having a range of states corresponding to the range of said meteorological conditions, a transcription device having a plurality of code symbols corresponding to said ranges of states, a plurality of pickup devices mounted in spaced relationship to each other and adjacent to said transcription device each being movable over said transcription device by the respective element related thereto for simultaneous selection of one of said code symbols corresponding to one of said states, and means whereby said pickups operate said transmitter in seriatim in accordance with said selected symbols.

5. A control apparatus for a transcription pickup device comprising a support having a vertical monofilar suspension, a first arm transversely disposed and pivotally mounted on said suspension said arm carrying at its free end a transcription pickup device, a cam wheel rotatably mounted adjacent said arm, a wind vane, means coupling said cam wheel to said wind vane for movement therewith, an electromagnet having an armature associated therewith and a solenoidal electromagnet having a cylindrical armature telescopically received therein for reciprocating movement disposed adjacent to and for coaction with said movable arm, and a unidirectional current circuit whereby said electromagnet may be energized and the consequent movement of the armature may cause the said movable arm to be displaced across said transcription device to a point determined by the instantaneous position of said eccentric wheel.

6. A telemetering apparatus comprising a base, a turntable rotatably mounted on said base, a driving mechanism including means for rotating and elevating said turntable, a coded transcription record mounted on and carried by said turntable, a plurality of weather sensitive elements, pickup devices connected to said weather sensitive elements and pivotally mounted on said base engageable by said record upon elevation of the turntable, said pickup devices being positioned relative to said record in accordance with meteorological conditions, whereby a predetermined set of code signals corresponding to the instantaneous value of the weather condition may be transmitted.

7. A telemetering system comprising a transcription device having a plurality of code symbols, a transmitting apparatus connected to said transcription device, a plurality of elements responsive to changes in certain meteorological conditions, pickup means connected to and activated by each of said elements and positioned relative to said transcription device in accordance with instantaneous values of said meteorological conditions, electric switches responsive to said symbols and carried by said pickup means for said transmitting apparatus and means for bringing said pickup means into engagement with said transcription device whereby said symbols may be employed in order to key said transmitting apparatus.

JAMES M. BRADY.

REFERENCES CITED

The following references are of record in the file of this patent:

UNITED STATES PATENTS

| Number | Name | Date |
|---|---|---|
| 546,228 | Davis et al. | Sept. 10, 1895 |
| 1,638,417 | Sperry | Aug. 9, 1927 |
| 1,673,369 | Mills | June 12, 1928 |
| 1,913,511 | Reynolds | June 13, 1933 |